United States Patent
Kidd

(10) Patent No.: US 11,769,256 B2
(45) Date of Patent: Sep. 26, 2023

(54) IMAGE CREATION FOR COMPUTER VISION MODEL TRAINING

(71) Applicant: Avanade Holdings LLC, Wilmington, DE (US)

(72) Inventor: Fergus Kidd, London (GB)

(73) Assignee: Avanade Holdings LLC, Wilmington, DE (US)

( * ) Notice: Subject to any disclaimer, the term of this patent is extended or adjusted under 35 U.S.C. 154(b) by 292 days.

(21) Appl. No.: 17/176,773

(22) Filed: Feb. 16, 2021

(65) Prior Publication Data

US 2022/0262008 A1 Aug. 18, 2022

(51) Int. Cl.
*G06T 7/194* (2017.01)
*G06T 5/00* (2006.01)
*G06T 11/60* (2006.01)
*G06F 18/214* (2023.01)

(52) U.S. Cl.
CPC ............ *G06T 7/194* (2017.01); *G06F 18/214* (2023.01); *G06T 5/002* (2013.01); *G06T 5/004* (2013.01); *G06T 11/60* (2013.01); *G06T 2207/20081* (2013.01); *G06T 2207/20132* (2013.01)

(58) Field of Classification Search
CPC ......... G06T 7/194; G06T 5/002; G06T 5/004; G06T 11/60; G06T 2207/20081; G06T 2207/20132; G06T 7/73; G06F 18/214; G06V 10/30; G06V 10/774
USPC ........................................................ 382/159
See application file for complete search history.

(56) References Cited

U.S. PATENT DOCUMENTS

| 10,049,308 | B1 | 8/2018 | Dhua et al. |
| 11,210,790 | B1 * | 12/2021 | Tamez-Pena ........ A61B 5/0042 |
| 11,216,666 | B2 * | 1/2022 | Klug ...................... G06V 20/35 |
| 11,341,367 | B1 * | 5/2022 | Barbosa .............. G06F 18/2148 |
| 11,341,612 | B1 * | 5/2022 | Martin .................... G06T 5/001 |
| 2018/0189951 | A1 * | 7/2018 | Liston ..................... G06T 7/194 |

(Continued)

FOREIGN PATENT DOCUMENTS

| CN | 111368789 A | * | 7/2020 | ......... G06K 9/00624 |
| CN | 108564120 B | * | 6/2022 | ........... G06K 9/4671 |
| TW | I743837 B | * | 10/2021 | ........... G06F 18/214 |

OTHER PUBLICATIONS

Sapp, Benjamin, et al., "A Fast Data Collection and Augmentation Procedure for Object Recognition," Association for the Advancement of Artificial Intelligence, 2008, 7 pages.

*Primary Examiner* — Tom Y Lu
*Assistant Examiner* — Pardis Sohraby
(74) *Attorney, Agent, or Firm* — Harrity & Harrity, LLP

(57) ABSTRACT

In some implementations, a device may obtain a set of input images, of an object of interest, that includes images that have a plain background. The device may obtain a set of background images that includes images associated with the object of interest. The device may generate, for an input image, a first modified image of the input image that removes a plain background of the input image. The device may generate, for the input image, a second modified image of the input image that is based on the first modified image and a background image. The device may generate, for the input image, a training image that includes an indication of a location of the object of interest depicted in the training image. The device may provide the training image to a training set, that includes a set of training images, for a computer vision model.

20 Claims, 7 Drawing Sheets

(56) References Cited

U.S. PATENT DOCUMENTS

| | | |
|---|---|---|
| 2021/0225037 A1 | 7/2021 | Aydin et al. |
| 2021/0407090 A1* | 12/2021 | Li .......................... G06N 3/045 |
| 2022/0092757 A1* | 3/2022 | Zhou ..................... G06V 10/25 |
| 2022/0101047 A1* | 3/2022 | Puri .......................... G06T 5/30 |
| 2022/0180122 A1 | 6/2022 | Kondo |
| 2022/0189088 A1* | 6/2022 | Bala ....................... G06T 11/60 |
| 2022/0207294 A1* | 6/2022 | Kim ....................... G06F 18/25 |
| 2022/0207729 A1* | 6/2022 | Boyd ................... G06V 10/774 |

\* cited by examiner

IMAGE CREATION FOR COMPUTER VISION MODEL TRAINING

BACKGROUND

Computer vision is an interdisciplinary scientific field that deals with how computers can be made to gain high-level understanding from digital images or videos. Computer vision tasks include acquiring, processing, analyzing and understanding digital images, and extraction of high-dimensional data from the real world in order to produce numerical or symbolic information. Computer vision may enable computers to identify and process objects in images and videos.

SUMMARY

In some implementations, a method includes obtaining, by a device, a set of input images of an object of interest, wherein the set of input images includes images that have a plain background; obtaining, by the device, a set of background images, wherein the set of background images includes images associated with the object of interest; generating, by the device and for an input image from the set of input images, a first modified image of the input image, wherein the first modified image removes a plain background of the input image; generating, by the device and for the input image, a second modified image of the input image that is based on the first modified image and a background image from the set of background images; generating, by the device and for the input image, a training image that includes an indication of a location of the object of interest depicted in the training image; and providing, by the device, the training image to a training set for a computer vision model, wherein the training set includes a set of training images that are based on the set of input images and the set of background images.

In some implementations, a device includes one or more memories and one or more processors, communicatively coupled to the one or more memories, configured to: receive, from a user device, a one or more input images of an object of interest; obtain one or more background images, wherein the one or more background images include images relevant to the object of interest; perform, for an input image from the one or more input images, a pre-processing operation to generate a first image that isolates the object of interest from the input image; perform, for the input image, a processing operation to generate a training image, wherein the processing operation includes modifying the first image to generate a modified first image, adding the modified first image to a background image from the one or more background images to generate a second image, and modifying the second image to generate the training image; generate a training set that includes one or more training images that are generated based on the one or more input images and the one or more background images; and provide the training set to a computer vision model to cause the computer vision model to be trained using the training set and to enable the computer vision model to identify the object of interest.

In some implementations, a non-transitory computer-readable medium storing a set of instructions includes one or more instructions that, when executed by one or more processors of a device, cause the device to: receive, from a user device, a one or more input images of an object of interest; obtain one or more background images, wherein the one or more background images include images relevant to the object of interest; perform, for an input image from the one or more input images, a pre-processing operation to generate a first image that isolates the object of interest from the input image; perform, for the input image, a processing operation to generate a training image based on the first image and a background image from the one or more background images; generate a training set that includes one or more training images that are generated based on the one or more input images and the one or more background images; and provide the training set to a computer vision model to cause the computer vision model to be trained using the training set and to enable the computer vision model to identify the object of interest.

DETAILED DESCRIPTION

Figure 1A:
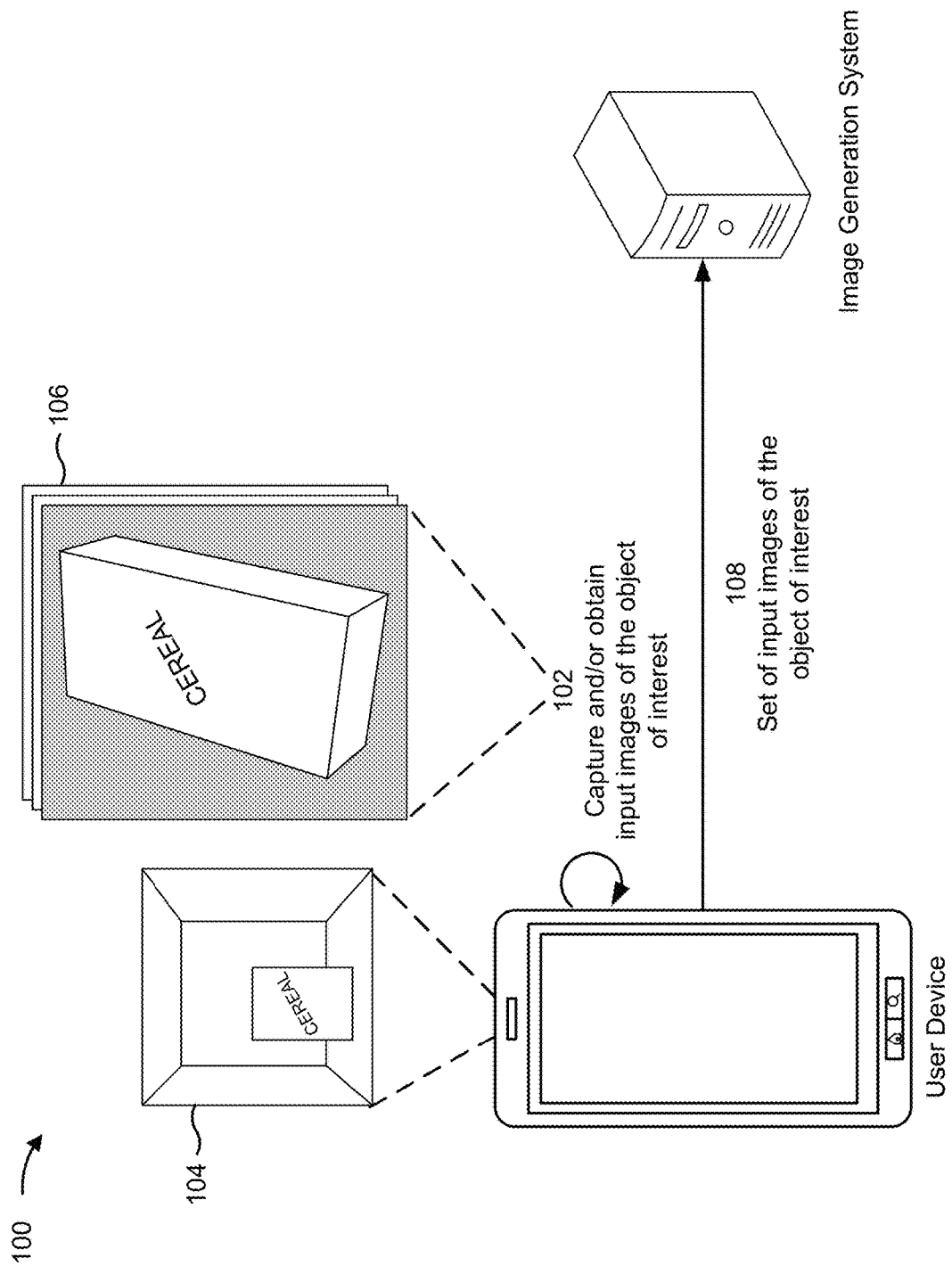
FIGS. 1A-1D are diagrams of an example implementation described herein.

The following detailed description of example implementations refers to the accompanying drawings. The same reference numbers in different drawings may identify the same or similar elements.

Computer vision models may enable a device (e.g., a computer) to recognize or identify different objects in an image or a video. For example, a computer vision model can be trained to recognize and/or identify an object in different images or videos. To train a computer vision model, many (e.g., hundreds or thousands) of training images of the object of interest (e.g., the object that the computer vision model is being trained to recognize and/or identify) must be input to the computer vision model. The training images may be images of the object of interest in an environment in which the object of interest would typically be found. For example, for an item that is typically sold in stores, the training images may be images of the object of interest in different stores (e.g., on a shelf, in a warehouse, and/or in a display) to enable the computer vision model to identify the object of interest in the environment in which the object of interest would typically be found.

Additionally, the training images must be tagged with a location of the object of interest within each training image. For example, to train the computer vision model, the computer vision model must be provided a training image that tells the computer vision model where the object of interest is located within the training image. As a result, the computer vision model can analyze the training image, with a knowledge of the location of the object of interest within the training image, to enable the computer vision model to recognize and/or identify the object of interest in other images or videos. Tagging of training images is a manual process that requires a user to analyze a training image and tag or indicate where the object of interest is located within the training image. For example, a user may draw or input a bounding box around the object of interest within the training image.

For a computer vision model to be sufficiently trained to recognize an object of interest, hundreds or thousands of training images associated with the object of interest must be provided to the computer vision model. As a result, this requires significant time, monetary, and processing overhead associated with manually tagging each training image that is to be provided to the computer vision model. A user may be required to capture hundreds or thousands of images to serve as training images. For example, the user may be required to capture images taken from different angles, in different locations, and/or in different environments (e.g., with different backgrounds). Moreover, as a user may be required to analyze and tag hundred or thousands of training images, a high rate of error may be introduced due to the user incorrectly or inaccurately tagging some of the training images. As a result, training a computer vision model to recognize tens, hundreds, or thousands of different objects of interest becomes an intensive task that consumes significant processing resources and time resources as the above process must be repeated for each object of interest. Further, if details or aspects of an object of interest change (e.g., if a packaging or display of the object of interest changes), then the computer vision model must be re-trained in the manner described above based on the new details or aspects of the object of interest, resulting in significant processing resources and time resources being consumed.

Some implementations described herein provide image creation for computer vision model training. For example, a system or platform can be provided with a small number (e.g., tens) of images of an object of interest. The system may automatically obtain a set of background images relevant to the object of interest. For example, if the object of interest is a cereal box, the system may automatically obtain background images of grocery stores or warehouses where a cereal box may typically be seen or found. As another example, if the object of interest is vehicle, the system may automatically obtain background images of streets, garages, and/or driveways.

The system may pre-process the images of the object of interest to isolate the object of interest in the image. For example, the system may remove a background, an outline, a mask, and/or crop the input image to isolate the object of interest in the image. The system may generate a training image by processing the isolated object of interest and a background image (e.g., automatically obtained by the system). For example, the system may rotate, skew, distort, and/or blur the isolated object of interest. The system may randomly place the isolated object of interest within the background image. The system may add randomized noise to the object of interest and/or the background image. The system may add a lighting effect to simulate spot lighting within the training image. The system can perform one or more (or all) of the above operations to generate a training image for a computer vision model. The system can repeat the above operations (e.g., randomly) for the input images and/or different background images to generate hundreds or thousands of training images to be provided to a computer vision model. By pre-processing and processing the input images with obtained background images, the system can generate synthetic training images that provide a similar level of training to a computer vision model as the manually captured and tagged training images described above. For example, by applying one or more (or all) of the above operations to generate a training image for a computer vision model, the system can avoid overfitting by the computer vision model to the provided input images and/or background images.

As the system has placed the isolated object of interest within the background image, the system has a knowledge of the location of the object of interest within the generated training image. Therefore, the system can automatically indicate a location of the object of interest within the generated training image (e.g., with a bounding box). This eliminates the risk of human error associated with manually tagging training images. Moreover, this significantly reduces the amount of time associated with generating a set of training images for a computer vision model.

As a result, the system enables training of a computer vision model from a small number of input images. As the input images are not required to be captured in different locations, and/or in different environments (e.g., with different backgrounds), the number of input images required is significantly reduced, thereby conserving computing resources (e.g., processing resources and/or memory resources) that would have otherwise have been used to process and store hundreds or thousands of input images. Moreover, the system provides an end-to-end system that is capable of training a computer vision model to recognize an object of interest based on a small number (e.g., tens) of input images of the object of interest without any additional user input or user intervention. This conserves significant time resources that would have otherwise been used to capture and manually tag training images. Moreover, this conserves computing resources (e.g., processing resources and/or memory resources) that would have otherwise been used to receive, process, and/or store hundreds or thousands of input images.

FIGS. 1A-1D are diagrams of an example implementation 100 associated with image creation for computer vision model training. As shown in FIGS. 1A-1D, example implementation 100 includes a user device, an image generation system, and one or more data sources or databases. These devices are described in more detail below in connection with FIG. 2 and FIG. 3.

As shown in FIG. 1A, and by reference number 102, the user device and/or the image generation system may capture or obtain one or more input images (e.g., a set of input images) of an object of interest. As described above, an object of interest may be an object that the computer vision model is being trained to recognize and/or identify. The object of interest can be any object that may appear in images or videos. As shown in FIGS. 1A-1D, the object of interest may be a cereal box. However, a cereal box is shown merely as an example and the processes and/or operations described herein may be similarly applied to any object of interest.

In some implementations, the user device may capture images of the object of interest using a camera of the user device. For example, a user may capture images of the object of interest using the camera of the user device. In some implementations, the user device may receive one or more images of the object of interest from another device (e.g., a server device or another user device).

As shown by reference number 104, the images captured using the user device may be associated with a plain background. A plain background may refer to a background that is substantially the same color and free of other objects or background objects or shapes. By capturing the images with a plain background, the image generation system may be enabled to remove the background from the image and isolate the object of interest within the input image, as described in more detail below. In some implementations, the images captured using the user device may be captured using a green screen background. In some implementations, the images captured using the user device may be captured on a floor or other surface that is substantially the same color and free of other objects.

In some implementations, the user device may obtain one or more input images from a web page or a web search. For example, the user device may search for images of the object of interest (e.g., that have a plain background). The user device may obtain one or more input images from another device (e.g., a server device or a data source) based on searching for images of the object of interest.

In some implementations, an input image may be a model or rendering of the object of interest. For example, an input image may be a three dimensional computer generated model of the object of interest that is obtained by the user device and/or the image generation system. The model or rendering of the object of interest may be a computer aided design (CAD) model and/or a photogrammetry model, among other examples.

In some implementations, the user device may capture and/or obtain the one or more input images via a web page being displayed on the user device and/or using an application that is executing on the user device. The web page or application may be provided by the image generation system. In some implementations, the web page or application may provide instructions or guidance to be displayed on the user device to assist a user when capturing the images of the object of interest. For example, the application may provide instructions or guidance to be displayed on the user device that indicates a type of image required, a number of images required, and/or instructions for the user, among other examples. For example, the application may cause an instruction of "take a picture from the left side of the object," "take a picture from the top of the object," and/or "take three more images of the object," to be displayed on the user device. This may ensure that a sufficient number of images are captured by the user device and/or that the images captured by the user device are of sufficient quality and/or are from a sufficient number of angles.

In some implementations, the application may provide a pre-processed image of the object of interest for display on the user device. For example, as described in more detail below, the image generation system may pre-process an input image to isolate the object of interest within the input image (e.g., by removing the background of the input image, outlining the object of interest, and/or masking the object of interest). The input generation system may cause a pre-processed image of the image captured by the user device (or of an image that is currently being viewed on the user device via the camera of the user device) to be displayed on the user device. This enables the user to view and inspect the pre-processed version of the image before submitted the image to the image generation system as an input image. As a result, the user may be enabled to detect when a background is not successfully removed (e.g., due to the background being insufficiently plain or uniform in color) and/or errors in the pre-processing of the image (e.g., resulting in the object of interest being unsuccessfully isolated). This may conserve resources (e.g., computing resources) that would have otherwise been used if the user were to submit an input image that would be unsuccessfully pre-processed by the image generation system.

As shown by reference number 106, the user device may obtain a set of input images to be provided to the image generation system. As described above, the set of input images may include images captured by a camera of the user device, images obtained by the user device (e.g., from another device or from a web search), and/or models or renderings of the object of interest, among other examples.

As shown by reference number 108, the user device may provide the set of input images of the object of interest to the image generation system. In some implementations, the user device may provide the set of input images via the application executing on the user device. In some implementations, the user device may indicate descriptive information associated with the set of input images. For example, a user may input a name or description of the object of interest. The descriptive information may be provided to the image generation system along with the set of input images.

In some implementations, the image generation system may obtain one or more input images (e.g., in addition to, or instead of, the set of input images provided by the user device). For example, the image generation system may obtain one or more input images via an automated web-based interaction (e.g., web searching and/or web crawling). The image generation system may search for the one or more input images based on the descriptive information provided by the user device.

In some implementations, the image generation system may analyze (e.g., using a computer vision technique) one or more input images provided by the user device to identify a content or a tag associated with the object of interest. For example, for an input image of a cereal box, the image generation system may analyze (e.g., using a computer vision technique) the input image to identify that the object of interest is a cereal box. The image generation system may search for one or more additional input images based on identifying the content or tag associated with an input image provided by the user device.

The image generation system may store the set of input images. For example, the image generation system may store the set of input images in a database, in a server device, and/or in a cloud-based device (e.g., a cloud-based server device), among other examples.

Figure 1B:
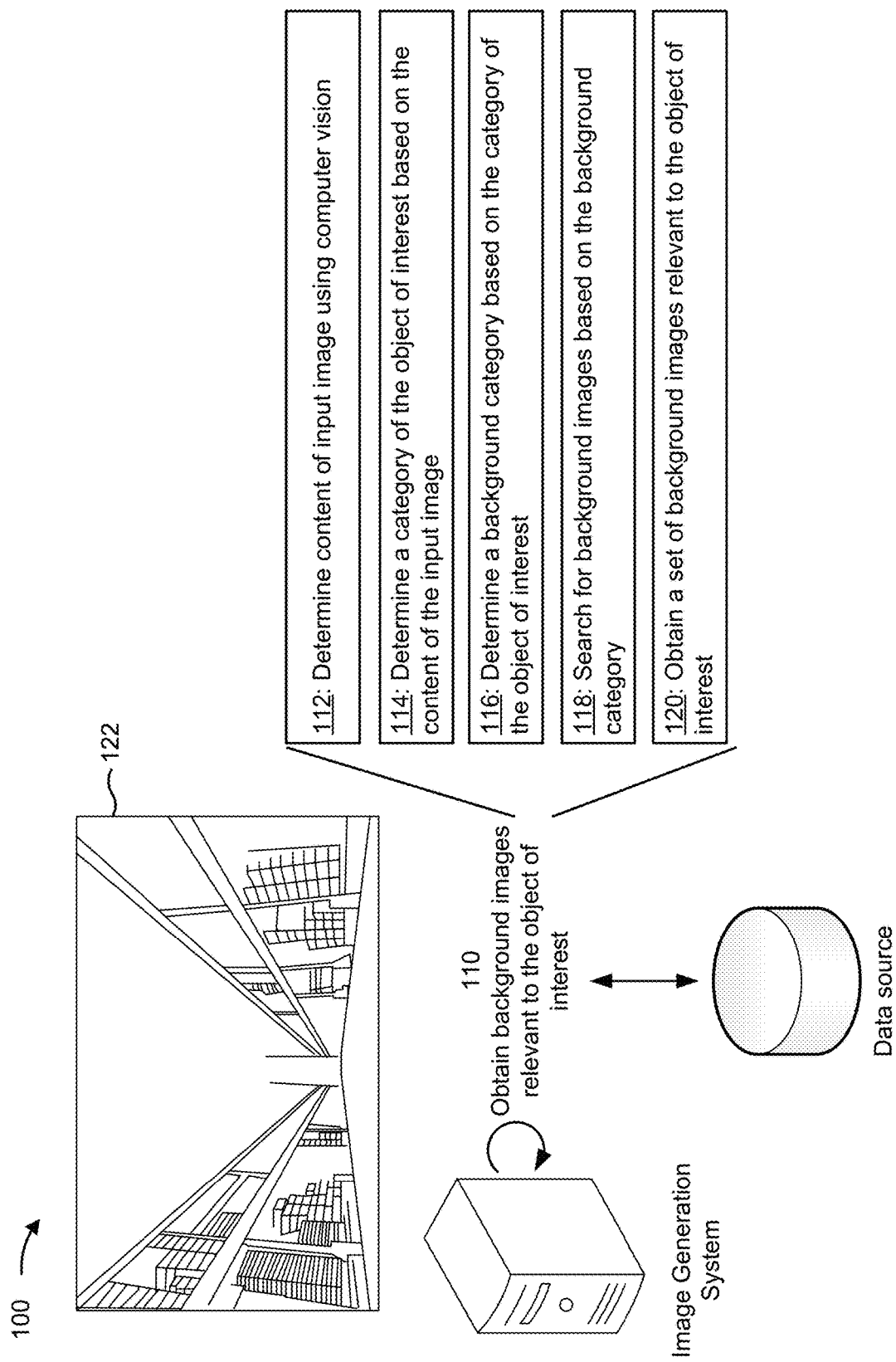

As shown in FIG. 1B, and by reference number 110, the image generation system may obtain one or more (e.g., a set of) background images that are relevant to the object of interest. A background image may be an image (e.g., a stock image) of an environment or location in which the object of interest (e.g., depicted in the set of input images) may be typically found. For example, if the object of interest is a cereal box, then a background image may include an image of store shelves, the interior of a grocery store, and/or a warehouse, among other examples. As another example, if the object of interest is a dinner table, then a background image may include an image of a dining room, an empty room, and/or a kitchen, among other examples.

As shown in FIG. 1B, the image generation system may obtain the background images from a data source (and/or a database). For example, the image generation system may communicate with the data source to search for and/or obtain the background images. As shown by reference number 112, the image generation system may analyze one or more of the input images to determine a content of the input image (e.g., of the object of interest). For example, the image generation system may analyze an input image using a computer vision technique (or a computer vision platform or model) to obtain the content of the object of interest (e.g., based on an output of the computer vision platform or model). For example, for an input image of a cereal box, the image generation system may determine that the content or the category of the input image is groceries, cereal, food boxes, and/or a brand of the cereal box, among other examples. As another example, for an input image of a baseball bat, the image generation system may determine that the content of the input image is sports equipment, baseball, and/or bat, among other examples.

As shown by reference number 114, the image generation system may determine a category of the object of interest based on the content of the input image. The category of the object of interest may be a generic category associated with the content of the input image. For example, for the input image of a cereal box, the image generation system may determine that the category of the object of interest is food and/or groceries, among other examples. As another example, for the input image of a baseball bat, the image generation system may determine that the category of the object of interest is sports equipment, among other examples.

As shown by reference number 116, the image generation system may determine a background category based on the category of the object of interest. The background category may be a generic category corresponding to images of environments or locations where objects associated with the category of the object of interest may be typically found or located. For example, for a category of food or groceries, a background category may be grocery stores, food stores, store shelves, and/or warehouses, among other examples. As another example, for the category of sports equipment, a background category may be a sports field, a baseball field, and/or a sports equipment retail store, among other examples.

In some implementations, the image generation system may determine the background category based at least in part on a database or a dictionary stored by the image generation system. For example, the image generation system may compile a database that correlates categories of an object of interest to a background category. For example, the database may indicate that a background category of grocery stores is associated with an object of interest category of food, groceries, cereal, vegetables, meat, fish, produce, and/or any other category of item or product that is typically found or sold in a grocery store. The image generation system may search or parse the database based on the identified or determined category of the object of interest, as described above (e.g., cereal box and/or food as shown in FIGS. 1A-1D), to identify a background category associated with the category of the object of interest.

As shown by reference number 118, the image generation system may search for background images based on the identified background category. For example, the image generation system may search for background images via an automated web-based interaction (e.g., web crawling or web searching). By searching for background images via an automated web-based interaction, the image generation system may conserve memory resources that would have otherwise been used to store a plurality of background images.

In some implementations, the image generation system may search a background image database for background images based on the identified background category. For example, the image generation system may store a plurality of background images in the background image database. The image generation system may search the background image database based on the identified background category. By storing the plurality of background images in the background image database, the image generation system may ensure that the images stored in the background image database are of a sufficient quality and/or size to be used by the image generation system.

In some implementations, the image generation system may determine one or more usage constraints and/or one or more size constraints for background images. A usage constraint may be related to an availability of the background image for use by the image generation system. For example, a use of some images may be restricted (e.g., due to an ownership of the image and/or copyright protection of the image). The usage constraint may indicate that only images that are available (e.g., publicly available) for use by the image generation system should be obtained by the image generation system (e.g., when searching for background images, as described above). A size constraint may indicate a minimum and/or a maximum size of images to be obtained by the image generation system (e.g., when searching for background images, as described above). For example, it may be beneficial to obtain background images that are larger in size to enable the image generation system to place the object of interest in more locations in the background images, resulting in a higher number of generated training images and/or a larger variation between the generated training images, as described in more detail below. The image generation system may search for background images based on the one or more usage constraints and/or one or more size constraints for background images.

As shown by reference number 120, the image generation system may obtain one or more (e.g., a set of) background images relevant to the object of interest based on searching for the background images as described above. For example, the image generation system may communicate with a data source, a database, and/or a server device to obtain a set of background images that meet a search criteria (e.g., background category, one or more usage constraints, and/or one or more size constraints) identified by the image generation system in the search. For example, as shown by reference number 122, an obtained background image for the input image of a cereal box may be an aisle of a store (e.g., a grocery store). The image generation system may store the set of background images. For example, the image generation system may store the set of background images in a database, in a server device, and/or in a cloud-based device (e.g., a cloud-based server device), among other examples.

In some implementations, the image generation system may analyze the obtained background images to ensure that the obtained background images can be used by the image generation system. For example, the image generation system may analyze the obtained background images to ensure that the obtained background images are of a sufficient quality to be used by the image generation system. In some implementations, the image generation system may analyze the obtained background images to determine a content and/or category of the obtained background images to ensure that the obtained background images are relevant to the object of interest. By analyzing the obtained background images in this manner, the image generation system can ensure that training images generated by the image generation system (e.g., as described below in more detail) are generated using high quality and/or accurate (e.g., depicting a correct background category) background images. This conserves computing resources (e.g., processing resources and/or memory resources) that would have otherwise been used generating training images using background images that have a low quality and/or that depict an incorrect background category.

Figure 1C:
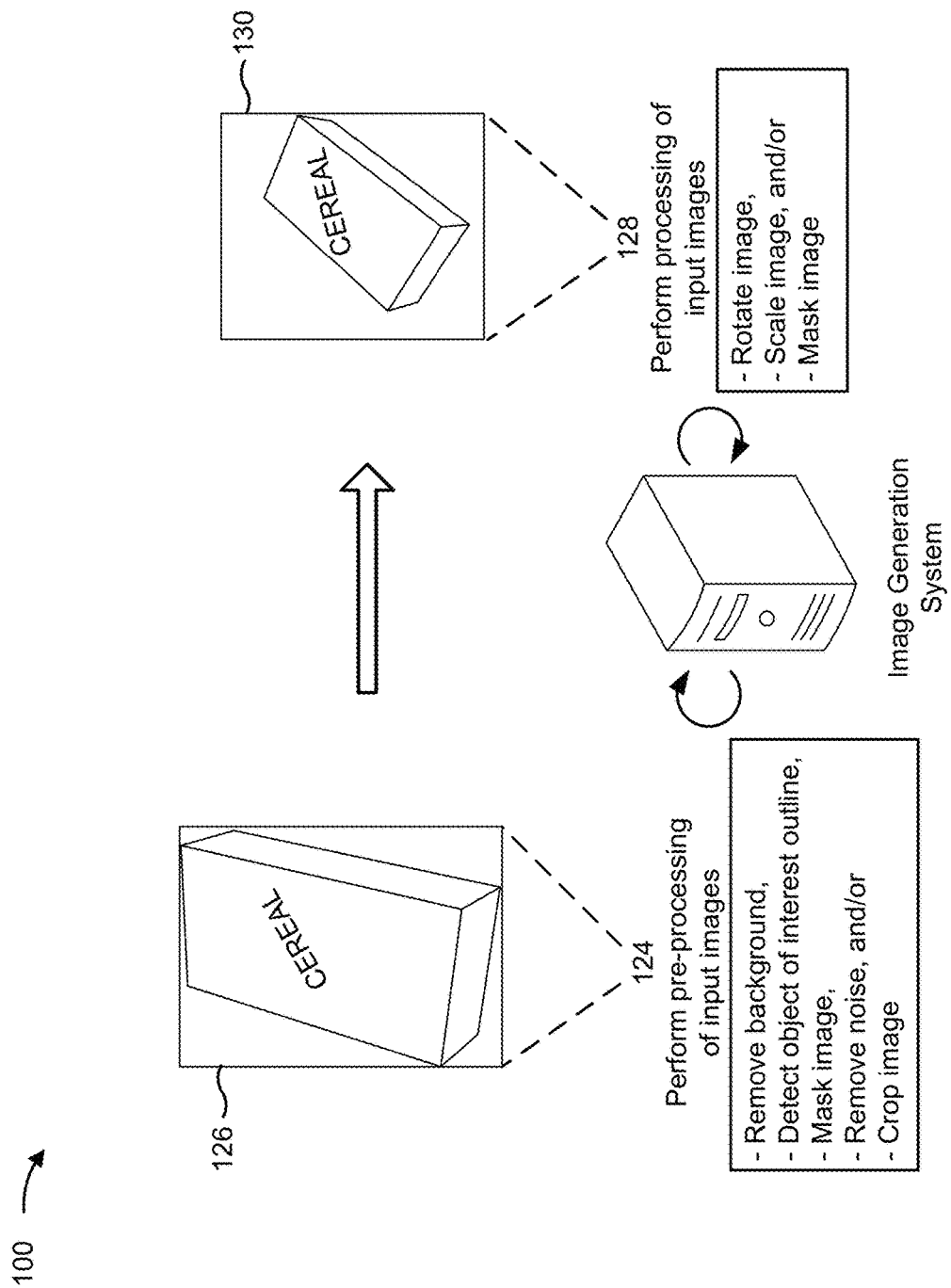

As shown in FIG. 1C, and by reference number 124, the image generation system may perform pre-processing of input images included in the set of input images. For example, the image generation system may perform pre-processing (e.g., as described herein) for each input image included in the set of input images. Pre-processing may refer to one or more steps or operations performed by the image generation system to isolate or remove the object of interest from an input image. The image generation system may detect an outline of the object of interest in the input image. For example, the image generation system may detect the outermost pixels of the input image based on the plain (e.g., solid color and/or uniform color) background of the input image. The image generation system may perform a masking operation to mask the object of interest to ensure that no details of the object of interest are lost during other pre-processing operations or processing operations, as described in more detail below. A pre-processed image may be referred to herein as a first modified image or a first image (e.g., obtained from an input image).

The image generation system may perform an operation to remove a background from the input image. As described above, the input image may include a plain (e.g., solid color and/or uniform color) background. The image generation system may detect the color of the background of the input image. The image generation system may remove the background of the input image by removing the color of the background from the input image. For example, as shown in FIG. 1A, a background of an input image may be grey. The image generation system may remove the color grey from the input image (e.g., as shown by reference number 126). In some cases, removal of the background from the input image may generate noise within the image. The image generation system may perform a noise reduction operation to remove any noise generated from the background removal.

The image generation system may perform an operation to crop the input image based on the size of the object of interest. For example, the image generation system may perform an operation to reduce a size of the input image to a smallest size that contains the object of interest. In other words, the image generation system may crop the input image such that the size of the input image is the smallest size possible while still depicting all details of or parts of the object of interest.

The image generation system may use the masking content of the object of interest (e.g., as described above) to ensure that all details and aspects of the object of interest are maintained in the pre-processed image. For example, in some cases, the object of interest may include aspects that have a similar color as the background of the input image. As a result, the image generation system may remove the color from these aspects when removing the background of the input image. Therefore, the image generation system may use the masking content of the object of interest to ensure that any details or aspects of the object of interest that were removed during a pre-processing operation are maintained or added back to the object of interest. As shown by reference number 126, an example of a pre-processed input image is depicted. The pre-processed image may not include a color of the background of the input image (e.g., grey as shown in FIG. 1A) and/or may be cropped to the smallest size while still including the object of interest (e.g., the cereal box as shown in FIG. 1C).

As shown by reference number 128, the image generation system may perform processing of input images included in the set of input images. For example, the image generation system may perform processing (e.g., as described herein) for each input image included in the set of input images. "Processing of an input image" may refer to modifying the object of interest, as depicted in the input image and/or obtained from a pre-processed input image, and/or modifying a background image (e.g., from the set of background images obtained by the image generation system) to generate a training image. The image generation system may perform processing of an input image to simulate real world lighting and/or camera effects. Processing operations may include one or more operations described herein in connection with reference numbers 128, 130, 132, 134, 136, and/or 138.

By processing input images as described herein, the image generation system may avoid or reduce a likelihood of overfitting by the computer vision model. "Overfitting" may refer to the computer vision model being trained using an insufficiently large number training images, resulting in the computer vision model being able to recognize and/or identify only the specific object of interest within the specific background(s) of the training images. By processing the input images, as described herein, the image generation system may generate training images that are sufficiently different and have sufficient variations to ensure that the computer vision model is not trained to recognize only the set of input images within the set of background images obtained by the image generation system. As a result, the image generation system is enabled to train a computer vision model with a relatively small number (e.g., tens) of input images while also avoiding overfitting of the computer vision model to the input images provided.

In some implementations, processing of an input image may include rotating the image of the object of interest (e.g., that is obtained via the pre-processing of an input image). For example, the image generation system may perform an operation to rotate the image of the object of interest. In some implementations, the image generation system may randomly rotate the image of the object of interest. The operation to rotate the image of the object of interest may cause training images to be generated by the image generation system having the object of interest shown in different orientations.

In some implementations, processing of an input image may include scaling or modifying the size of the object of interest as depicted in the image that is obtained via the pre-processing of an input image. For example, the image generation system may perform an operation to modify the size of the image that is obtained via the pre-processing of an input image (and/or of the object of interest as depicted in the image that is obtained via the pre-processing of an input image). In some implementations, the image generation system may randomly modify the size of the object of interest as depicted in the image that is obtained via the pre-processing of an input image (e.g., within a bound of a range of sizes to ensure that the details or aspects of the object of interest are maintained when the size is modified).

In some implementations, the image generation system may modify the size of the image that is obtained via the pre-processing of an input image based on a size of a selected background image. For example, the image generation system may select a background image from the set of background images obtained by the image generation system, as described below in more detail, to be included in a generated training image. The image generation system may modify or scale the size of the object of interest, as depicted in the pre-processed image, based on the size of the selected background image to ensure that the training image depicts the object of interest in a size that is appropriate for the background image selected.

In some implementations, processing of an input image may include masking the object of interest (e.g., after performing an operation to rotate, scale, and/or modify the size of the object of interest as depicted in a pre-processed image). For example, the image generation system may detect an outline of the object of interest after the object of interest has been rotated and/or scaled, as described above.

The image generation system may create a masking content of the object of interest based on detecting the outline of the object of interest. The image generation system may perform one or more operations to ensure that there are no holes and/or to fill in any holes (e.g., missing details from incorrect removal of a background color) within the object of interest as depicted. The image generation system may mask an original image of the object of interest (e.g., showing all of the details of the object of interest) to the processed image to ensure that the details of the object of interest are depicted in the processed image.

As shown by reference number 130, an example processed image (e.g., after the image generation system performs one or more operations to rotate, scale, modify the size of, and/or mask the object of interest as depicted in a pre-processed image) is depicted. As shown in FIG. 1C, the processed image may have a reduced size and/or may be rotated from the pre-processed image shown by reference number 126.

Figure 1D:
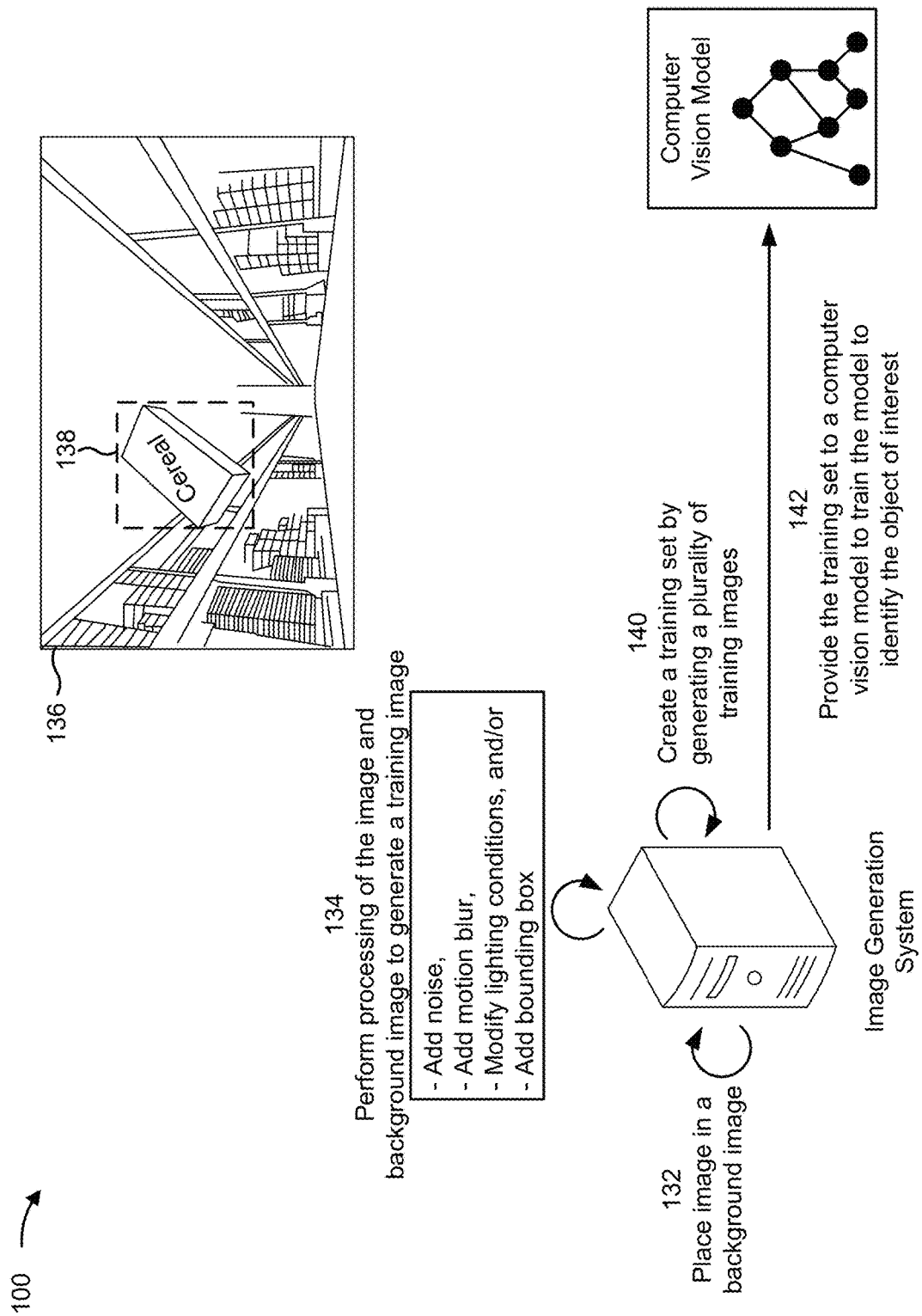

As shown in FIG. 1D, and by reference number 132, the image generation system may place an image of the object of interest (e.g., the processed image described above in connection with reference number 128) in or on a background image. For example, as described above, the image generation system may select a background image from the set of background images obtained by the image generation system. In some implementations, the image generation system may randomly select a background image from the set of background images. For example, the image generation system may merge the image of the object of interest and the background image to form a single image.

The image generation system may randomly place the image of the object of interest in or on the selected background image. That is, the image generation system may place the image of the object of interest in a random location within the selected background image. By randomly placing the image of the object of interest in or on the selected background image, the image generation system may ensure that training images are generated by the image generation system having the object of interest in different locations of a background image.

As shown by reference number 134, the image generation system may perform one or more processing operations on the image of the object of interest and/or the selected background image to generate a training image. For example, the image generation system may process the image that includes the image of the object of interest and the selected background image to simulate real world camera effects, such as camera noise, motion blur, and/or lighting effects, among other examples.

For example, when an image is captured using a camera, the camera may introduce noise to the image captured by the camera. For example, noise may be introduced into an image due to static electricity within components of the camera and/or heat generated by a sensor of the camera. If a computer vision model were to be trained using training images that did not include this noise, then the computer vision model may be unable to recognize the object of interest in images that do include this type of noise. Similarly, lighting conditions in the real world may vary based on where light is originating from when an image is captured. If a computer vision model were to be trained using training images that included a light source from only one location (e.g., from behind the object of interest), then the computer vision model may be unable to recognize the object of interest in images that have lighting originating from other locations (e.g., from in front of the object of interest). By performing these processing operations, as described below in more detail, the image generation system may ensure that the computer vision model is not trained to recognize the object of interest only as depicted in the input images provided to the image generation system and/or the background images obtained by the image generation system (e.g., to avoid overfitting by the computer vision model).

In some implementations, the image generation system may perform an operation to add noise to the image of the object of interest and/or the selected background image. For example, the image generation system may add impulse noise, fat-tail distributed noise, and/or Gaussian noise, among other examples, to the image of the object of interest and/or the selected background image to simulate noise that would be generated by a camera in a real world scenario. Impulse noise and fat-tail distributed noise may sometimes be referred to as salt-and-pepper noise.

In some implementations, the image generation system may perform an operation to add a motion blur effect to the image of the object of interest and/or the selected background image. "Motion blur" may refer to the apparent streaking of moving objects in an image that is caused when the image being captured changes during the capturing of a single exposure of the image. For example, when a camera creates an image in the real world, that image does not represent a single instant of time. Because of technological constraints or artistic decisions, the image may represent the scene being captured over a period of time. Most often this exposure time is brief enough that the image captured by the camera appears to capture an instantaneous moment. However, in some cases, such as with a fast moving object, a movement of the camera, and/or a longer exposure time, a blurring effect may be captured in the image. The image generation system may randomly add a blurring effect to the image of the object of interest and/or the selected background image to simulate the blurring effects that result in real world scenarios.

In some implementations, the image generation system may perform an operation to add a lighting effect to the image of the object of interest and/or the selected background image. For example, the image generation system may perform an operation to modify the lighting effects as depicted in the image of the object of interest and/or the selected background image. For example, as described above, in the real world, lighting conditions may vary. For example, light may originate from different locations and/or different angles causing different lighting effects to be depicted in captured images or videos. The image generation system may perform an operation to simulate different spot lighting or different lighting effects within the image of the object of interest and/or the selected background image. In some implementations, the image generation system may randomly change lighting conditions depicted in the object of interest and/or the selected background image. As a result, the image generation system may avoid or reduce a likelihood of the computer vision model being trained to recognize an object of interest only when the lighting conditions are as depicted in the image of the object of interest and/or the selected background image (e.g., may avoid or reduce a likelihood of overfitting by the computer vision model).

As shown by reference number 136, an example of a generated training image is depicted (e.g., generated based on performing one or more (or all) of the operations described above). In some implementations, the image generation system may perform an operation to include an indication of the location of the object of interest within the background image. For example, the image generation system may add a bounding box, as shown by reference number 138, to the generated training image. In some implementations, the image generation system may include a JavaScript object notation (JSON) code that indicates the object of interest location within the generated training image (e.g., that indicates the location of the bounding box). In some implementations, the indication of the location of the object of interest may be generated during the pre-processing and/or processing stages (e.g., before the image of the object of interest is added to or placed in the selected background image).

In some implementations, a benefit (e.g., in training the computer vision model using the generated training images) may be realized by performing processing operations in a particular order. For example, an order of the processing operations (e.g., after pre-processing an input image) may be first placing the pre-processed image randomly within a selected background image, second randomly rotating the pre-processed image, third randomly skewing or distorting (e.g., modifying the size) of the pre-processed image (e.g., in both an x-axis direction and a y-axis direction), fourth adding a random amount of motion blur to the pre-processed image and/or the selected background image, fifth adding a random amount of noise (e.g., salt-and-pepper noise and/or Gaussian noise) to the pre-processed image and/or the selected background image indiscriminately, and sixth randomly simulating different lighting effects from any direction across the pre-processed image and/or the selected background image indiscriminately. By performing processing operations in this order, the image generation system may generate training images that more accurately mirror or simulate images taken by cameras in the real world. As a result, a training of the computer vision model using the generated training images may be improved as the generated training images more accurately mirror or simulate images taken by cameras in the real world.

As shown by reference number 140, the image generation system may generate a training set for the computer vision model by generating a plurality of training images in a similar manner as described above. For example, after generating a training image in the manner as described above, the image generation system may add the training image to the training set. The image generation system may generate a plurality of training images using the set of input images (e.g., using the same input image and/or different input images) and the set of background images obtained by the image generation system (e.g., using the same background image and/or different background images). In this way, the image generation system may generate a training set that includes hundreds or thousands of the training images that are generated from a relatively small number (e.g., tens) of input images. The training images generated by the image generation system may accurately mirror or simulate images taken by cameras in the real world, enabling the computer vision model to be trained to recognize or identify the object of interest depicted in the input images.

As shown by reference number 142, the image generation system may provide the training set (e.g., the plurality of training images generated by the image generation system) to the computer vision model to train the model to recognize and/or identify the object of interest. For example, the image generation system may train the computer vision model using the training set. As a result, the computer vision model may be enabled to recognize and/or identify the object of interest in an image or video that is input to the computer vision model.

The image generation system described herein enables training of the computer vision model from a small number (e.g., tens) of input images. As the input images are not required to be captured in different locations, and/or in different environments (e.g., with different backgrounds), the number of input images required is significantly reduced, thereby conserving computing resources (e.g., processing resources and/or memory resources) that would have otherwise been used to process and store hundreds or thousands of input images. Moreover, the image generation system provides an end-to-end system that is capable of training a computer vision model to recognize an object of interest based on a small number (e.g., tens) of input images of the object of interest without any additional user input or user intervention (e.g., without any manual tagging or user review of the input images). This conserves significant time resources that would have otherwise been used to capture and manually tag training images. Moreover, this conserves computing resources (e.g., processing resources and/or memory resources) that would have otherwise been used to receive, process, and/or store hundreds or thousands of input images. Furthermore, if details or aspects of an object of interest change (e.g., if a packaging or display of the object of interest changes), the image generation system may re-train the computer vision model to recognize the object of interest (e.g., with the new details or aspects) from a small number of input images, rather than requiring hundreds or thousands of images of the object of interest (e.g., with the new details or aspects) to re-train the computer vision model.

As indicated above, FIGS. 1A-1D are provided as an example. Other examples may differ from what is described with regard to FIGS. 1A-1D. The number and arrangement of devices shown in FIGS. 1A-1D are provided as an example. In practice, there may be additional devices, fewer devices, different devices, or differently arranged devices than those shown in FIGS. 1A-1D. Furthermore, two or more devices shown in FIGS. 1A-1D may be implemented within a single device, or a single device shown in FIGS. 1A-1D may be implemented as multiple, distributed devices. Additionally, or alternatively, a set of devices (e.g., one or more devices) shown in FIGS. 1A-1D may perform one or more functions described as being performed by another set of devices shown in FIGS. 1A-1D.

Figure 2:
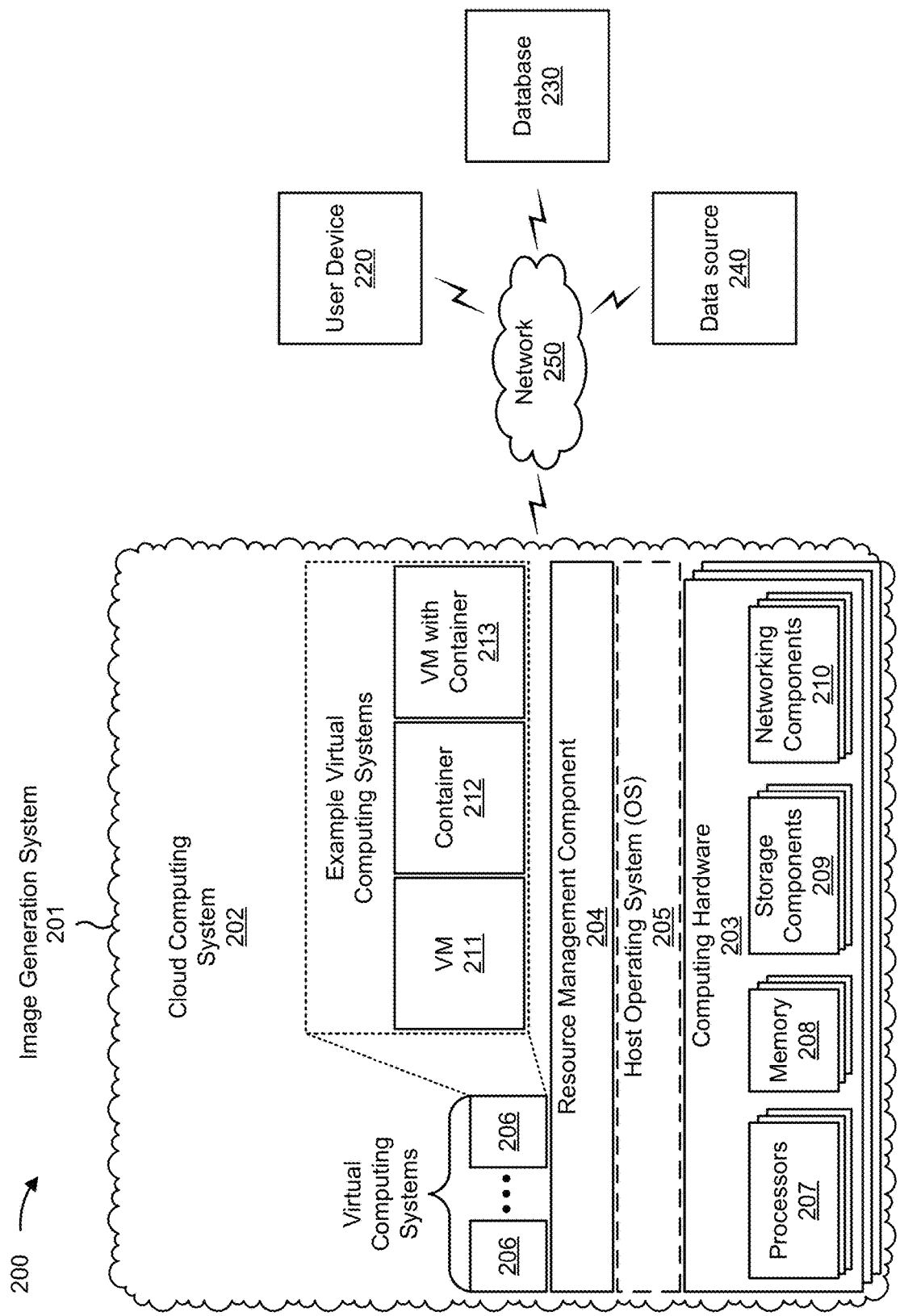
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include an image generation system 201, which may include one or more elements of and/or may execute within a cloud computing system 202. The cloud computing system 202 may include one or more elements 203-213, as described in more detail below. As further shown in FIG. 2, environment 200 may include a user device 220, a database 230, a data source 240, and/or a network 250. Devices and/or elements of environment 200 may interconnect via wired connections and/or wireless connections.

The cloud computing system 202 includes computing hardware 203, a resource management component 204, a host operating system (OS) 205, and/or one or more virtual computing systems 206. The resource management component 204 may perform virtualization (e.g., abstraction) of computing hardware 203 to create the one or more virtual computing systems 206. Using virtualization, the resource management component 204 enables a single computing device (e.g., a computer or a server) to operate like multiple computing devices, such as by creating multiple isolated virtual computing systems 206 from computing hardware 203 of the single computing device. In this way, computing hardware 203 can operate more efficiently, with lower power consumption, higher reliability, higher availability, higher utilization, greater flexibility, and lower cost than using separate computing devices.

Computing hardware 203 includes hardware and corresponding resources from one or more computing devices. For example, computing hardware 203 may include hardware from a single computing device (e.g., a single server) or from multiple computing devices (e.g., multiple servers), such as multiple computing devices in one or more data centers. As shown, computing hardware 203 may include one or more processors 207, one or more memories 208, one or more storage components 209, and/or one or more networking components 210. Examples of a processor, a memory, a storage component, and a networking component (e.g., a communication component) are described elsewhere herein.

The resource management component 204 includes a virtualization application (e.g., executing on hardware, such as computing hardware 203) capable of virtualizing computing hardware 203 to start, stop, and/or manage one or more virtual computing systems 206. For example, the resource management component 204 may include a hypervisor (e.g., a bare-metal or Type 1 hypervisor, a hosted or Type 2 hypervisor, or another type of hypervisor) or a virtual machine monitor, such as when the virtual computing systems 206 are virtual machines 211. Additionally, or alternatively, the resource management component 204 may include a container manager, such as when the virtual computing systems 206 are containers 212. In some implementations, the resource management component 204 executes within and/or in coordination with a host operating system 205.

A virtual computing system 206 includes a virtual environment that enables cloud-based execution of operations and/or processes described herein using computing hardware 203. As shown, a virtual computing system 206 may include a virtual machine 211, a container 212, or a hybrid environment 213 that includes a virtual machine and a container, among other examples. A virtual computing system 206 may execute one or more applications using a file system that includes binary files, software libraries, and/or other resources required to execute applications on a guest operating system (e.g., within the virtual computing system 206) or the host operating system 205.

Although the image generation system 201 may include one or more elements 203-213 of the cloud computing system 202, may execute within the cloud computing system 202, and/or may be hosted within the cloud computing system 202, in some implementations, the image generation system 201 may not be cloud-based (e.g., may be implemented outside of a cloud computing system) or may be partially cloud-based. For example, the image generation system 201 may include one or more devices that are not part of the cloud computing system 202, such as device 300 of FIG. 3, which may include a standalone server or another type of computing device. The image generation system 201 may perform one or more operations and/or processes described in more detail elsewhere herein.

The user device 220 includes one or more devices capable of receiving, generating, storing, processing, and/or providing information associated with image creation for computer vision model training, as described elsewhere herein. The user device 220 may include a communication device and/or a computing device. For example, the user device 220 may include a wireless communication device, a mobile phone, a user equipment, a laptop computer, a tablet computer, a desktop computer, a set-top box, a wearable communication device (e.g., a smart wristwatch, a pair of smart eyeglasses, a head mounted display, or a virtual reality headset), or a similar type of device.

The database 230 includes one or more devices capable of receiving, generating, storing, processing, and/or providing information associated with image creation for computer vision model training, as described elsewhere herein. The database 230 may include a communication device and/or a computing device. For example, the database 230 may include a server, a database server, an application server, a client server, a web server, a host server, a proxy server, a virtual server (e.g., executing on computing hardware), a server in a cloud computing system, a device that includes computing hardware used in a cloud computing environment, or a similar type of device. The database 230 may communicate with one or more other devices of environment 200, as described elsewhere herein.

The data source 240 includes one or more devices capable of receiving, generating, storing, processing, and/or providing information associated with image creation for computer vision model training, as described elsewhere herein. The data source 240 may include a communication device and/or a computing device. For example, the data source 240 may include a database, a server, a database server, an application server, a client server, a web server, a host server, a proxy server, a virtual server (e.g., executing on computing hardware), a server in a cloud computing system, a device that includes computing hardware used in a cloud computing environment, or a similar type of device. The data source 240 may communicate with one or more other devices of environment 200, as described elsewhere herein.

Network 250 includes one or more wired and/or wireless networks. For example, network 250 may include a cellular network, a public land mobile network (PLMN), a local area network (LAN), a wide area network (WAN), a private network, the Internet, and/or a combination of these or other types of networks. The network 250 enables communication among the devices of environment 200.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
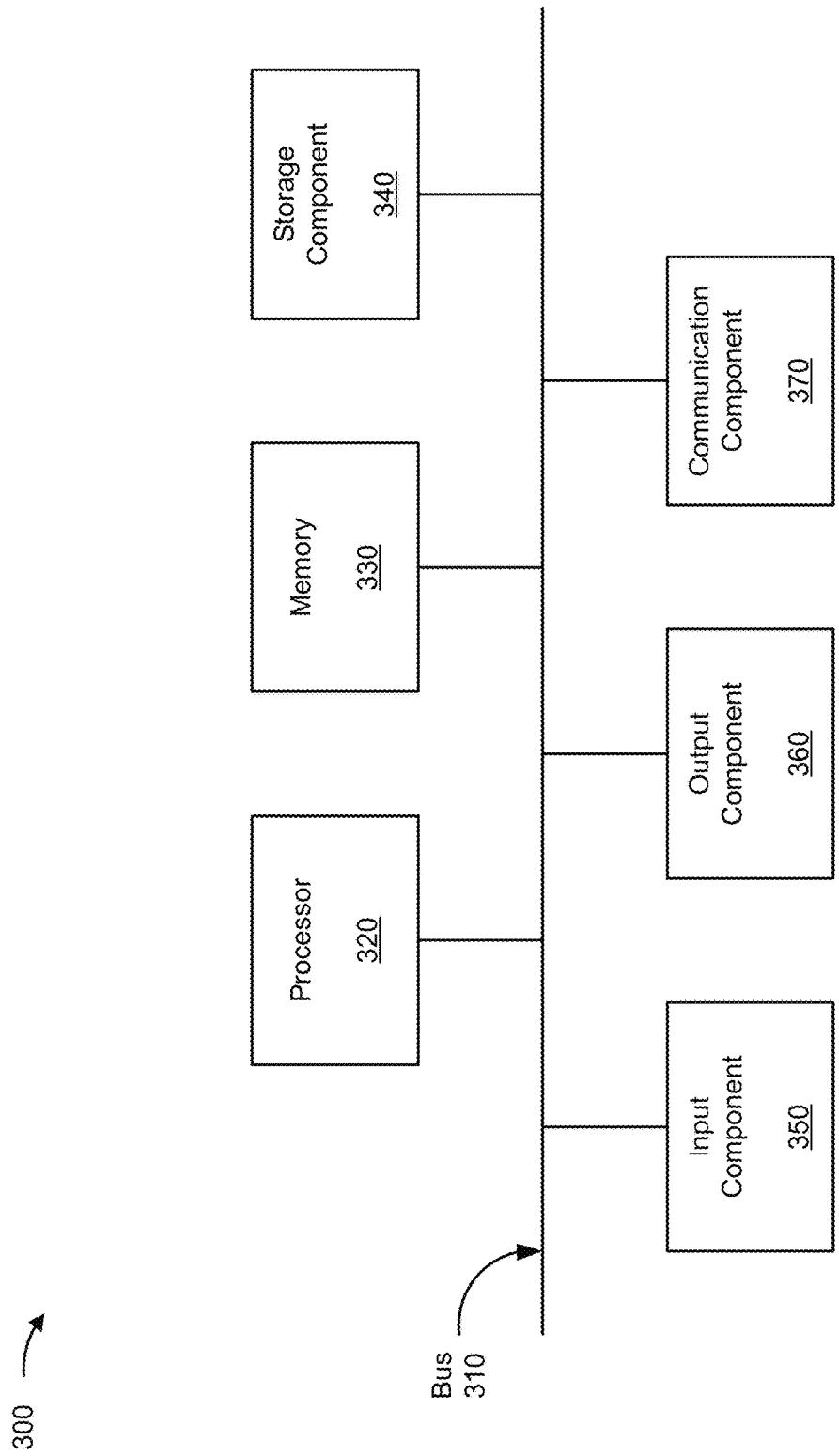
FIG. 3 is a diagram of example components of one or more devices of FIG. 2.

FIG. 3 is a diagram of example components of a device 300, which may correspond to image generation system 201, user device 220, database 230, and/or data source 240. In some implementations, image generation system 201, user device 220, database 230, and/or data source 240 may include one or more devices 300 and/or one or more components of device 300. As shown in FIG. 3, device 300 may include a bus 310, a processor 320, a memory 330, a storage component 340, an input component 350, an output component 360, and a communication component 370.

Bus 310 includes a component that enables wired and/or wireless communication among the components of device 300. Processor 320 includes a central processing unit, a graphics processing unit, a microprocessor, a controller, a microcontroller, a digital signal processor, a field-programmable gate array, an application-specific integrated circuit, and/or another type of processing component. Processor 320 is implemented in hardware, firmware, or a combination of hardware and software. In some implementations, processor 320 includes one or more processors capable of being programmed to perform a function. Memory 330 includes a random access memory, a read only memory, and/or another type of memory (e.g., a flash memory, a magnetic memory, and/or an optical memory).

Storage component 340 stores information and/or software related to the operation of device 300. For example, storage component 340 may include a hard disk drive, a magnetic disk drive, an optical disk drive, a solid state disk drive, a compact disc, a digital versatile disc, and/or another type of non-transitory computer-readable medium. Input component 350 enables device 300 to receive input, such as user input and/or sensed inputs. For example, input component 350 may include a touch screen, a keyboard, a keypad, a mouse, a button, a microphone, a switch, a sensor, a global positioning system component, an accelerometer, a gyroscope, and/or an actuator. Output component 360 enables device 300 to provide output, such as via a display, a speaker, and/or one or more light-emitting diodes. Communication component 370 enables device 300 to communicate with other devices, such as via a wired connection and/or a wireless connection. For example, communication component 370 may include a receiver, a transmitter, a transceiver, a modem, a network interface card, and/or an antenna.

Device 300 may perform one or more processes described herein. For example, a non-transitory computer-readable medium (e.g., memory 330 and/or storage component 340) may store a set of instructions (e.g., one or more instructions, code, software code, and/or program code) for execution by processor 320. Processor 320 may execute the set of instructions to perform one or more processes described herein. In some implementations, execution of the set of instructions, by one or more processors 320, causes the one or more processors 320 and/or the device 300 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 3 are provided as an example. Device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
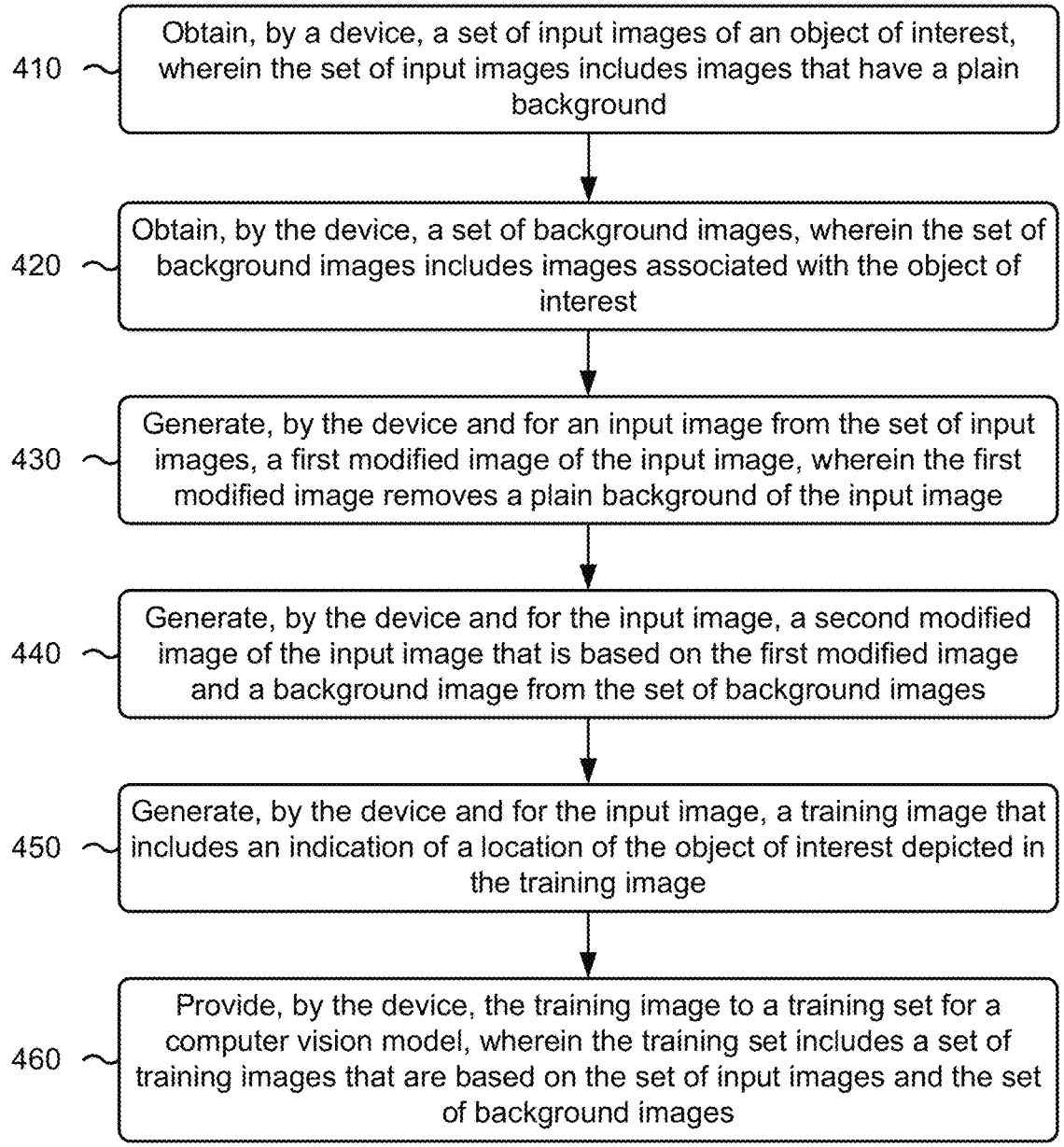
FIG. 4 is a flowchart of an example process relating to image creation for computer vision model training.

FIG. 4 is a flowchart of an example process 400 associated with image creation for computer vision model training. In some implementations, one or more process blocks of FIG. 4 may be performed by a device (e.g., image generation system 201). In some implementations, one or more process blocks of FIG. 4 may be performed by another device or a group of devices separate from or including the device, such as a user device (e.g., user device 220), a database (e.g., database 230), and/or a data source (e.g., data source 240), among other examples. Additionally, or alternatively, one or more process blocks of FIG. 4 may be performed by one or more components of device 300, such as processor 320, memory 330, storage component 340, input component 350, output component 360, and/or communication component 370.

As shown in FIG. 4, process 400 may include obtaining a set of input images of an object of interest, where the set of input images includes images that have a plain background (block 410). For example, the device may obtain a set of input images of an object of interest, where the set of input images includes images that have a plain background, as described above.

As further shown in FIG. 4, process 400 may include obtaining a set of background images, where the set of background images includes images associated with the object of interest (block 420). For example, the device may obtain a set of background images, where the set of background images includes images associated with the object of interest, as described above.

As further shown in FIG. 4, process 400 may include generating, for an input image from the set of input images, a first modified image of the input image, where the first modified image removes a plain background of the input image (block 430). For example, the device may generate, for an input image from the set of input images, a first modified image of the input image, where the first modified image removes a plain background of the input image, as described above.

As further shown in FIG. 4, process 400 may include generating, for the input image, a second modified image of the input image that is based on the first modified image and a background image from the set of background images (block 440). For example, the device may generate, for the input image, a second modified image of the input image that is based on the first modified image and a background image from the set of background images, as described above.

As further shown in FIG. 4, process 400 may include generating, for the input image, a training image that includes an indication of a location of the object of interest depicted in the training image (block 450). For example, the device may generate, for the input image, a training image that includes an indication of a location of the object of interest depicted in the training image, as described above.

As further shown in FIG. 4, process 400 may include providing the training image to a training set for a computer vision model, wherein the training set includes a set of training images that are based on the set of input images and the set of background images (block 460). For example, the device may provide the training image to a training set for a computer vision model, wherein the training set includes a set of training images that are based on the set of input images and the set of background images, as described above.

Process 400 may include additional implementations, such as any single implementation or any combination of implementations described below and/or in connection with one or more other processes described elsewhere herein.

In a first implementation, obtaining the set of input images for the object of interest comprises at least one of: receiving, from a user device, one or more input images included in the set of input images, or obtaining one or more input images included in the set of input images via an automated web-based interaction.

In a second implementation, alone or in combination with the first implementation, process 400 includes determining a background category of the object of interest based on one or more input images from the set of input images, and obtaining the set of background images comprises searching, via an automated web-based interaction, for images associated with the background category of the object of interest, and obtaining one or more background images based on searching for the images associated with the background category.

In a third implementation, alone or in combination with one or more of the first and second implementations, determining the background category of the object of interest comprises analyzing the one or more input images from the set of input images using a computer vision technique to determine content associated with the object of interest, and determining the background category of the object of interest based on the content associated with the object of interest.

In a fourth implementation, alone or in combination with one or more of the first through third implementations, generating the first modified image of the input image comprises at least one of removing the plain background from the input image to obtain the first modified image that includes an image of the object of interest, performing a cropping operation to adjust a size of the input image, performing a masking operation to generate a masking content of the input image and an outline of the object of interest within the input image, or performing a noise reduction operation to remove noise from the input image.

In a fifth implementation, alone or in combination with one or more of the first through fourth implementations, generating the second modified image of the input image that is based on the first modified image comprises at least one of performing a scaling operation to modify a size of the first modified image, performing a rotation operation to modify an orientation of the first modified image, or performing a masking operation to place a masking content of input image in the second modified image.

In a sixth implementation, alone or in combination with one or more of the first through fifth implementations, generating the training image comprises randomly placing the second modified image on the background image in an image location to generate a processed image that includes the second modified image and the background image, performing an operation to modify the processed image to generate the training image, wherein the operation includes at least one of performing a noise addition operation to add noise to the processed image, performing a blurring operation to add a motion blur effect to the processed image, or performing lighting modification operation to modify lighting conditions in the processed image, and generating an indication of the image location that indicates the location of the second modified image in the training image.

In a seventh implementation, alone or in combination with one or more of the first through sixth implementations, process 400 includes training a computer vision model using the training set to enable the computer vision model to identify the object of interest in an image.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
    obtaining, by a device, a set of input images of an object of interest, wherein the set of input images includes images that have a plain background;
    obtaining, by the device, a set of background images, wherein the set of background images includes images associated with the object of interest,
        wherein obtaining the set of background images comprises:
            determining a category associated with the object of interest,
            determining a background category corresponding to images of environments or locations associated with where the category of the object of interest is typically found or located,
            compiling a database that correlates the background category to the category associated with the object of interest, and
            searching for the set of background images based on determining the background category;

generating, by the device and for an input image from the set of input images, a first modified image of the input image, wherein the first modified image removes a plain background of the input image;

generating, by the device and for the input image, a second modified image of the input image that is based on the first modified image and a background image from the set of background images;

generating, by the device and for the input image, a training image based on the second modified image that includes an indication of a location of the object of interest depicted in the training image; and providing, by the device, the training image to a training set for a computer vision model, wherein the training set includes a set of training images that are based on the set of input images and the set of background images.

2. The method of claim 1, wherein obtaining the set of input images for the object of interest comprises at least one of:

receiving, from a user device, one or more input images included in the set of input images; or obtaining one or more input images included in the set of input images via an automated web-based interaction.

3. The method of claim 1, further comprising:

wherein obtaining the set of background images comprises:

searching, via an automated web-based interaction, for images associated with the background category of the object of interest; and obtaining one or more background images based on searching for the images associated with the background category.

4. The method of claim 3, wherein determining the background category comprises:

analyzing the one or more input images from the set of input images using a computer vision technique to determine content associated with the object of interest; and determining the background category based on the content associated with the object of interest.

5. The method of claim 1, wherein generating the first modified image of the input image comprises at least one of:

removing the plain background from the input image to obtain the first modified image that includes an image of the object of interest, performing a cropping operation to adjust a size of the input image, performing a masking operation to generate a masking content of the input image and an outline of the object of interest within the input image, or performing a noise reduction operation to remove noise from the input image.

6. The method of claim 1, wherein generating the second modified image of the input image that is based on the first modified image comprises at least one of:

performing a scaling operation to modify a size of the first modified image, performing a rotation operation to modify an orientation of the first modified image, or performing a masking operation to place a masking content of input image in the second modified image.

7. The method of claim 1, wherein generating the training image comprises:

randomly placing the second modified image on the background image in an image location to generate a processed image that includes the second modified image and the background image;

performing an operation to modify the processed image to generate the training image, wherein the operation includes at least one of:

performing a noise addition operation to add noise to the processed image, performing a blurring operation to add a motion blur effect to the processed image, or performing lighting modification operation to modify lighting conditions in the processed image; and generating an indication of the image location that indicates the location of the second modified image in the training image.

8. The method of claim 1, further comprising:

training a computer vision model using the training set to enable the computer vision model to identify the object of interest in an image.

9. A device, comprising:

one or more memories; and one or more processors, communicatively coupled to the one or more memories, configured to:

receive, from a user device, a one or more input images of an object of interest;

obtain one or more background images, wherein the one or more background images include images relevant to the object of interest, wherein the one or more processors, to obtain the one or more background images, are configured to:

determine a category associated with the object of interest, determine a background category corresponding to images of environments or locations associated with where the category of the object of interest is typically found or located, compile a database that correlates the background category to the category associated with the object of interest, and search for the one or more background images based on determining the background category;

perform, for an input image from the one or more input images, a pre-processing operation to generate a first image that isolates the object of interest from the input image;

perform, for the input image, a processing operation to generate a training image, wherein the processing operation includes:

modifying the first image to generate a modified first image, adding the modified first image to a background image from the one or more background images to generate a second image, and modifying the second image to generate the training image;

generate a training set that includes one or more training images that are generated based on the one or more input images and the one or more background images; and provide the training set to a computer vision model to cause the computer vision model to be trained using the training set and to enable the computer vision model to identify the object of interest.

10. The device of claim 9, wherein the one or more processors, when receiving the one or more input images of the object of interest, are configured to:

receive an input image that was obtained via at least one of:

a camera of the user device, or
a web search for the object of interest performed using the user device.

11. The device of claim 9, wherein the one or more processors are further configured to:
identify content of an input image from the one or more input images; and
determine one or more usage constraints or size constraints,
wherein the one or more processors, when obtaining the one or more background images, are configured to:
search for background images based on the background category and the one or more usage constraints or size constraints; and
obtain the one or more background images based on searching for the background images.

12. The device of claim 11, wherein the one or more processors, when determining the background category, are configured to:
parse the database based on the content of the input image, wherein the database identifies a plurality of background categories and content associated with each background category of the plurality of background categories.

13. The device of claim 9, wherein the one or more processors, when performing the pre-processing operation, are configured to:
generate the first image by performing at least one of:
a first operation to remove a background of the input image to isolate the object of interest from the input image,
a second operation to crop the input image based on a size of the object of interest within the input image, or
a third operation to remove noise from the input image.

14. The device of claim 9, wherein the one or more processors, when modifying the first image to generate the modified first image, are configured to:
generate the modified first image by performing at least one of:
a fourth operation to modify a size of the first image based on a size of the background image,
a fifth operation to rotate the object of interest within the first image, or
a sixth operation to create a masking content of the object of interest within the first image.

15. The device of claim 9, wherein the one or more processors, when modifying the second image to generate the training image, are configured to:
generate the training image by performing at least one of:
a seventh operation to add at least one of impulse noise or Gaussian noise to the second image,
an eighth operation to add a motion blur effect to the second image,
a ninth operation to add a lighting effect to the second image, or
a tenth operation to add a bounding box to the second image to indicate a location of the modified first image within the training image.

16. A non-transitory computer-readable medium storing a set of instructions, the set of instructions comprising:
one or more instructions that, when executed by one or more processors of a device, cause the device to:
receive, from a user device, a one or more input images of an object of interest;
obtain one or more background images, wherein the one or more background images include images relevant to the object of interest,
wherein the one or more instructions, that cause the one or more processors to obtain the one or more background images, cause the one or more processors to:
determine a category associated with the object of interest,
determine a background category corresponding to images of environments or locations associated with where the category of the object of interest is typically found or located,
compile a database that correlates the background category to the category associated with the object of interest, and
search for the one or more background images based on determining the background category;
perform, for an input image from the one or more input images, a pre-processing operation to generate a first image that isolates the object of interest from the input image;
perform, for the input image, a processing operation to generate a training image based on the first image and a background image from the one or more background images;
generate a training set that includes one or more training images that are generated based on the one or more input images and the one or more background images; and
provide the training set to a computer vision model to cause the computer vision model to be trained using the training set and to enable the computer vision model to identify the object of interest.

17. The non-transitory computer-readable medium of claim 16, wherein the one or more instructions further cause the device to:
identify content of an input image from the one or more input images;
determine one or more usage constraints or size constraints,
wherein the one or more instructions, that cause the device to obtain the one or more background images, cause the device to:
search for background images based on the background category and the one or more usage constraints or size constraints; and
obtain the one or more background images based on searching for the background images.

18. The non-transitory computer-readable medium of claim 16, wherein the one or more instructions, that cause the device to perform the pre-processing operation, cause the device to:
generate the first image via at least one of:
removing a background of the input image to isolate the object of interest from the input image,
cropping the input image based on a size of the object of interest within the input image, or
removing noise from the input image.

19. The non-transitory computer-readable medium of claim 16, wherein the one or more instructions, that cause the device to perform the processing operation, cause the device to:
modify the first image to generate a modified first image via at least one of:
modifying a size of the first image based on a size of the background image, rotating the object of interest within the first image, or
generating a masking content of the object of interest within the first image.

20. The non-transitory computer-readable medium of claim 16, wherein the one or more instructions, that cause the device to perform the processing operation, cause the device to:
generate a second image by placing the first image in the background image; and
generate the training image via at least one of:
adding at least one of impulse noise or Gaussian noise to the second image,
adding a motion blur effect to the second image,
adding a lighting effect to the second image, or
adding a bounding box to the second image to indicate a location of the first image within the second image.

\* \* \* \* \*